(12) United States Patent
Smeets

(10) Patent No.: US 7,253,798 B2
(45) Date of Patent: Aug. 7, 2007

(54) CHARGE PUMP

(75) Inventor: Patrick Emanuel Gerardus Smeets, Eindhoven (NL)

(73) Assignee: NXP B.V., Eindhoven (NL)

( * ) Notice: Subject to any disclaimer, the term of this patent is extended or adjusted under 35 U.S.C. 154(b) by 145 days.

(21) Appl. No.: 10/513,535

(22) PCT Filed: Apr. 11, 2003

(86) PCT No.: PCT/IB03/01492

§ 371 (c)(1),
(2), (4) Date: Nov. 5, 2004

(87) PCT Pub. No.: WO03/096520

PCT Pub. Date: Nov. 20, 2003

(65) Prior Publication Data
US 2005/0146904 A1 Jul. 7, 2005

(30) Foreign Application Priority Data
May 7, 2002 (EP) .................................. 02076827

(51) Int. Cl.
*G09G 3/36* (2006.01)
(52) U.S. Cl. .......................................... 345/94; 363/60
(58) Field of Classification Search ................... 345/87, 345/94, 204; 363/60, 59
See application file for complete search history.

(56) References Cited

U.S. PATENT DOCUMENTS

| | | | | |
|---|---|---|---|---|
| 4,290,100 A | | 9/1981 | Squires | |
| 4,897,774 A | * | 1/1990 | Bingham et al. | 363/61 |
| 5,237,209 A | * | 8/1993 | Brewer | 307/110 |
| 5,262,934 A | * | 11/1993 | Price | 363/60 |
| 5,306,954 A | | 4/1994 | Chan et al. | |
| 5,461,557 A | * | 10/1995 | Tamagawa | 363/60 |
| 6,229,530 B1 | * | 5/2001 | Ushiki | 345/204 |

* cited by examiner

*Primary Examiner*—Amr A. Awad
*Assistant Examiner*—Stephen G Sherman

(57) ABSTRACT

A charge pump (1) for generating a first output voltage (Vo1) between a first output terminal (E) and a reference terminal (D), and a second output voltage (Vo2) between a second output terminal (F) and the reference terminal (D). The charge pump (1) further comprises a first input terminal (C) for inputting a DC voltage (V), a first storage capacitor (Cr1) coupled between the first output terminal (E) and the reference terminal (D) and a second storage capacitor (Cr2) coupled between the second output terminal (F) and the reference terminal (D). The charge pump (1) further comprises a first terminal (A) and a second terminal (B) for coupling a pump capacitor (Cp) to a first triplet of switches (S1, S2, S5) and to a second triplet of switches (S3, S4, S6). The first triplet of switches (S1, S2, S5) selectively couples the first terminal (A) to either the first input terminal (C) or to the reference terminal (D) or to the second output terminal (F). The second triplet of switches (S3, S4, S6) selectively couples the second terminal (B) to either the first input terminal (C) or to the reference terminal (D) or to the first output terminal (E).

5 Claims, 1 Drawing Sheet

CHARGE PUMP

The invention relates to a charge pump for generating a first output voltage between a first output terminal and a reference terminal and a second output voltage between a second output terminal and the reference terminal, the charge pump further comprising a first input terminal for inputting a DC voltage, a first storage capacitor coupled between the first output terminal and the reference terminal and a second storage capacitor coupled between the second output terminal and the reference terminal.

Charge pumps are very much used in portable devices supplied from a battery type source. They usually provide at their output DC voltages whose magnitude depends on an input DC voltage. Charge pumps comprise capacitors and switches, a state ON or OFF of any switch being controlled by binary signals generated by a counter/decoder driven by a periodical clock signal.

U.S. Pat. No. 5,237,209 describes a charge pump that generates a bipolar voltage output comprising 11 switches and 4 capacitors. Two of the capacitors are used as storage devices for the output voltages. The other two capacitors are periodically coupled to the input voltage terminals and output terminals via the switches. The order in which the switches are ON or OFF is determined by a counter, the counter being driven by a periodical binary signal i.e. Clock. At the circuit input is applied a DC voltage V. The circuit is capable to generate a bipolar output voltage that is substantially equal to double the input voltage V i.e. it generates the output voltages +2V and −2V. It is observed that there are devices as displays that need to be supplied by an asymmetrical voltage as −V, +2V that still have a low cost and if possible occupying a reduced area within a chip.

It is therefore an object of present invention to provide a low cost charge pump generating balanced or unbalanced bipolar voltage.

In accordance with the invention this is achieved in a device as described in the introductory paragraph, said charge pump further comprising:

a first terminal and a second terminal for coupling a pump capacitor to a first triplet of switches and to a second triplet of switches, the first triplet of switches selectively coupling the first terminal to either the first input terminal or to the reference terminal or to the second output terminal, the second triplet of switches selectively coupling the second terminal to either the first input terminal or to the reference terminal or to the first output terminal.

It is observed that the total necessary number of switches is 6 that is substantially less then the switch number in the prior art. Furthermore the charge pump comprises only 3 capacitors instead of 4. Two capacitors are used as storage devices for the output voltages and one is used for generating the output voltages. Using less capacitors and switches the charge pump according to the invention is cheaper and when integrated occupies less area than the prior-art circuit.

In an embodiment of the invention a vector of signals is generated periodically with a period controlled by the reference periodical signal. A cycle for generating bipolar voltages either symmetric or asymmetric does not change from one design to another and therefore the voltages are generated with the same efficiency. The switches could be of electromagnetic type, phototransistors controlled by a radiation signal, bipolar transistors controlled by voltages or currents, CMOS transistors controlled by voltages. One would choose a switch type or another depending on a specific application. For example, for portable handsets it is desirable to have a small voltage generator and if possible integrated in the same chip with the supplied device. Therefore a possible solution could be use of CMOS transistors that could be easily integrated.

In another embodiment of the invention a charge pump according to the invention is used in a supplying system. The supplying system comprises the charge pump coupled to a LCD display, said display being supplied via the first output voltage and via the second output voltage. The supplying system is rather flexible because it could provide bipolar both symmetric and asymmetric output voltages and could be easily adapted to different type of displays because the output voltages could be easily provided to any of the outputs i.e. the first output voltage could be either positive or negative having a voltage magnitude of either V or 2V.

The above and other features and advantages of the invention will be apparent from the following description of the exemplary embodiments of the invention with reference to the accompanying drawings, in which.

Figure 1:
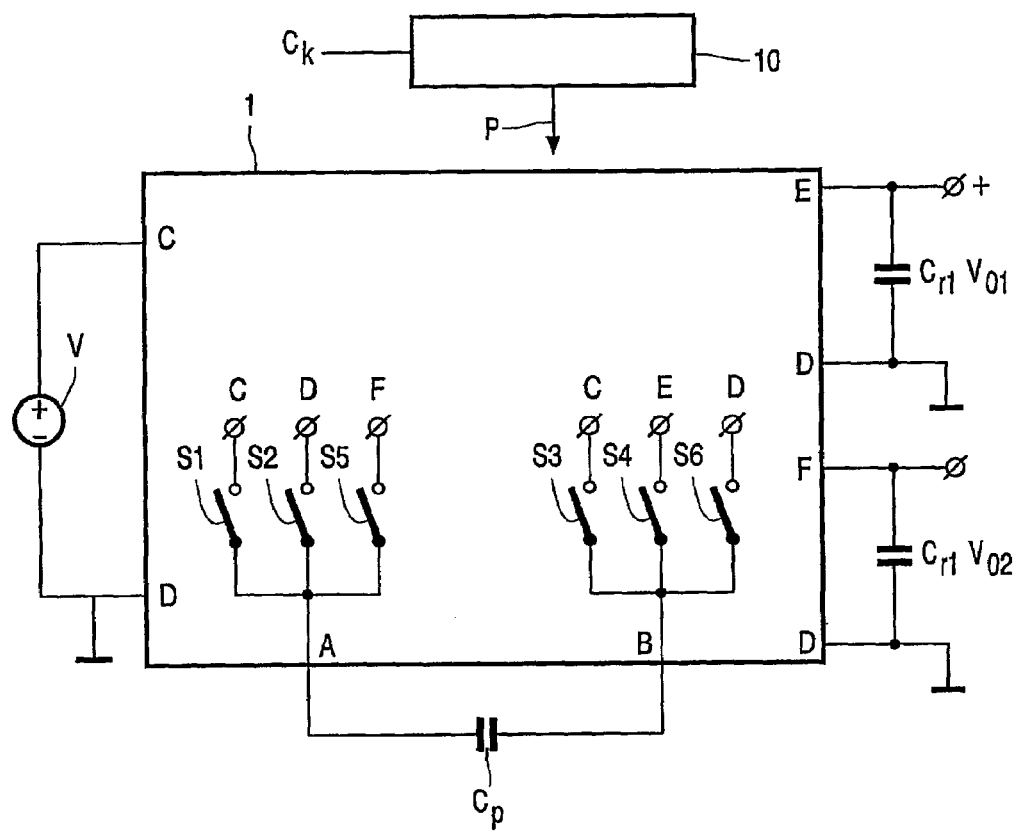
FIG. 1 depicts a detailed diagram of a charge pump according to the invention.

The charge pump 1 generates a first output voltage Vo1 between a first output terminal E and a reference terminal D, and a second output voltage Vo2 between a second output terminal P and the reference terminal D. The voltages have different signs i.e. one is negative and the other is positive. The charge pump 1 further comprises a first input terminal C for inputting a DC voltage V. The charge pump 1 includes a first storage capacitor Cr1 coupled between the first output terminal E and the reference terminal D and a second storage capacitor Cr2 coupled between the second output terminal F and the reference terminal D. The charge pump 1 also includes a first terminal A and a second terminal B for coupling a pump capacitor Cp to a first triplet of switches S1, S2, S5 and to a second triplet of switches S3, S4, S6. The first triplet of switches S1, S2, S5 selectively couples the first terminal A to either the first input terminal C or to the reference terminal D or to the second output terminal F. The second triplet of switches S3, S4, S6 selectively couples the second terminal B to either the first input terminal C or to the reference terminal D or to the first output terminal E. A phase generator/decoder 10 generates a vector of signals P (Phase) synchronized with a reference periodical signal Ck said vector of signals controlling a state of the switches i.e. ON or OFF. The charge pump 1 generates one of the combination (−V, 2V), (−2V, 2V), (−V, V), (V, −V), (2V, −2V), (2V, −V) for the first output voltage Vo1 and the second output voltage Vo2 respectively. It is observed that the charge pump 1 uses only 3 capacitors Cp, Cr1 and Cr2 i.e. one less than in the cited prior art. Furthermore the total number of switches is 6 i.e. less than in the cited prior art. Therefore, the charge pump 1 of the present application offers a cheaper solution than that used in the cited prior art. The phase generator/decoder 10 generates a vector of signals having four components i.e. Phase 1, Phase 2, Phase 3 and Phase 4.

In Table 1, the switching sequence of the switches is presented.

TABLE 1

| Vo2 | Vo1 | Phase 1 | Phase 2 | Phase 3 | Phase 4 |
|---|---|---|---|---|---|
| −V | +2 V | S2, S3 | S1, S4 | S2, S3 | S5, S6 |
| −2 V | +2 V | S2, S3 | S1, S4 | S2, S4 | S5, S6 |
| −V | +V | S2, S3, S4 | S5, S6 | S2, S3, S4 | S5, S6 |
| +V | −V | S1, S5, S6 | S2, S4 | S1, S5, S6 | S2, S4 |
| +2 V | −2 V | S1, S6 | S3, S5 | S5, S6 | S2, S4 |
| +2 V | −V | S1, S6 | S3, S5 | S1, S6 | S2, S4 |

In Table 1 in any line are indicated the voltage values of the first output voltage Vo1 and the second output voltage Vo2. In any column of Table 1 there are indicated which of the switches are in an ON state, all the other switches being in an OFF state. Let us consider that we want to obtain Vo1=+2V and Vo2=−V. It results from Table 1 that the first component of the vector of signals Phase 1 command switches S2 and S3 in an ON state. It results that the pump capacitor Cp is charged at a voltage V having a plus at the terminal B and a minus at the terminal A. When the second component of the vector of signals Phase 2 is applied the switches S1 and S4 go in an ON state. Therefore first output voltage Vo1 becomes +2V, the voltage being stored in the first storage capacitor Cr1. The signal Phase 3 determines the switches S2 and S3 to go in an ON state, the pump capacitor being charged is the same way as with the signal Phase 1. Finally, when the signal Phase 4 is applied the switches S5 and S6 go in an ON state and the voltage across the second storage capacitor Cr2 is −V. The process in continued with another cycle Phase 1 . . . Phase 4 and so on. It is observed that at one moment only one component of the vector of signals Phase is active i.e. in a state that determines an ON state of a switch. The control signals could be generated using an arrangement comprising a binary counter coupled to a decoder 1 of 4 the arrangement being known per se.

Any switch has an input terminal, an output terminal and a control terminal. Any switch could be either in an ON state or in an OFF state. In an ON state any switch connects the output terminal to the input terminal. In an OFF state there is no connection between the output terminal and the input terminal. The state of any switch is determined by a control signal applied to the control terminal. Any switch could be of electromagnetic type, phototransistors controlled by a radiation, bipolar transistors controlled by voltages or currents, CMOS transistors controlled by voltages. Depending on the switch type, the control signal determining an ON state could be either logical 1 or logical 0 and respectively logical 0 or logical 1 determining an OFF state of the switch. One would choose a switch type or another depending on a specific application. For example, for portable handsets it is desirable to have a small voltage generator and if possible integrated in the same chip with the supplied device. Therefore a possible solution could be use of CMOS transistors that are relatively easy to be integrated.

It is further observed that the vector of signals Phase is generated periodically with a period controlled by the reference periodical signal Ck. This situation is characteristic for a burst mode of operation of the charge pump 1. In a controlled mode using known techniques several parameters as stop switching, switching frequency and duty cycle changing could be controlled. In a stop switching situation, when an output voltage reaches a predefined value the switches charging that output are no longer switched ON until the output voltage becomes lower than the predefined voltage. The charge transfer between the pump capacitor Cp and the storage capacitors Cr1, Cr2 depends on the frequency and duration of the vector of signals Phase and therefore depends on the Clock. Hence, controlling the clock of phase generator/decoder 10 the charge transfer could be controlled. It could be defined a duty cycle between charging the pump capacitor Cp i.e. Phase 1 and Phase 3 and discharging the pump capacitor Cp i.e. Phase 2 and Phase 4. This parameter also controls the charge transfer between the pump capacitor Cp and the first storage capacitor Cr1 and the second storage capacitor Cr2.

Charge pumps generating bipolar voltages are also disclosed in e.g. U.S. Pat. Nos. 5,262,934 and 5,461,557. These charge pumps use 4 capacitors, two pump capacitors and two storage capacitors and more switches than in the present invention. Therefore they have a higher price and use more chip area than the charge pump 1 according to the present invention.

It should be pointed out that the Table 1 could be used for generating the vector of signals Phase for the combination of output voltages indicated there. This could be realized in a device comprising for instance a counter coupled to a memory, said memory storing a representation of Table 1. It is further observed that the signals generation according to the Table 1 could be implemented in a software program. The program could run on a controller that generates the vector of signals Phase according to Table 1. It should be emphasized that the output voltages could be either positive or negative and the charge pump 1 generates bipolar voltages either equal to each other or not. Hence the charge pump 1 could be used in both applications requesting a symmetrical bipolar voltage supply or in applications requesting asymmetric voltage supply.

Figure 2:
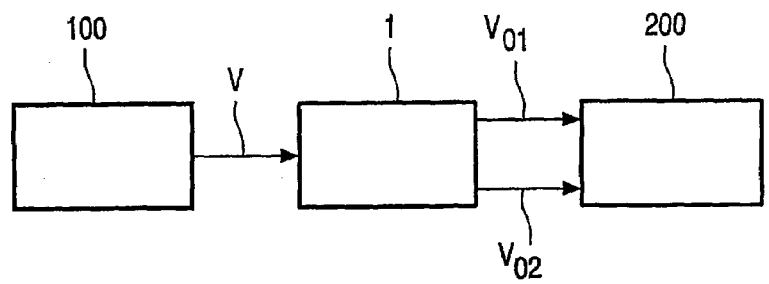
FIG. 2 depicts a supplying system according to the invention.

Such a situation is depicted in FIG. 2. The charge pump 1 is coupled to a battery 100, the battery 100 generating the voltage V. The charge pump 1 generates the output voltages Vo1 and Vo2 for supplying a LCD display 200, said LCD display 200 needing an asymmetric bipolar supplying voltage i.e. +2V and −1V. It is observed that if a load of the charge pump 1 needs supplying symmetrical bipolar voltages that could be found in Table 1 these voltages could be generated using the charge pump according to the present invention.

It is observed that depending on the logic circuit used to control the triplets of switches the output voltages could be different than that shown in Table 1, but a power efficiency of the charge pump would be lower. Additional voltages, other than that claimed in claim 3 could be obtained using more pump capacitors and switches in a straightforward manner. Furthermore, depending on a load, the charging sequence described in Table 1 could be modified for maintaining a relatively constant voltage at any output of the charge pump.

It is remarked that the scope of protection of the invention is not restricted to the embodiments described herein. Neither is the scope of protection of the invention restricted by the reference numerals in the claims. The word 'comprising' does not exclude other parts than those mentioned in the claims. The word 'a(n)' preceding an element does not exclude a plurality of those elements. Means forming part of the invention may both be implemented in the form of dedicated hardware or in the form of a programmed purpose processor. The invention resides in each new feature or combination of features.

The invention claimed is:

1. A charge pump for generating a first output voltage between a first output terminal and a reference terminal and a second output voltage between a second output terminal and the reference terminal, comprising:

a first input terminal adapted to provide a direct current (DC) voltage;

a first storage capacitor coupled between the first output terminal and the reference terminal and a second storage capacitor coupled between the second output terminal and the reference terminal; and a first terminal and a second terminal adapted to couple a pump capacitor to a first triplet of switches and to a second triplet of switches, wherein: each of the switches of the first triplet of switches selectively connects the first terminal directly to a respective one of the first input terminal, the reference terminal or to the second output terminal, and the second triplet of switches selectively couples the second terminal to either the first input terminal or to the reference terminal or to the first output terminal.

2. A charge pump as claimed in claim 1, wherein each of the switches of the second triplet of switches selectively connects the second terminal directly to a respective one of the first input terminal, or the reference terminal or the first output terminal.

3. A charge pump as claimed in claim 1, further comprising a phase generator/decoder for generating a vector of signals synchronized with a reference periodical signal said vector of signals controlling a state of the switches.

4. A supplying system adapted for use in a liquid crystal display (LCD), comprising:

a charge pump adapted to generate a first output voltage between a first output terminal and a reference terminal and a second output voltage between a second output terminal and the reference terminal, wherein the charge pump further comprises:

a first input terminal adapted to provide a direct current (DC) voltage;

a first storage capacitor coupled between the first output terminal and the reference terminal and a second storage capacitor coupled between the second output terminal and the reference terminal; and a first terminal and a second terminal adapted to couple a pump capacitor to a first triplet of switches and to a second triplet of switches, wherein: each of the switches of the first triplet of switches selectively connects the first terminal directly to a respective one of the first input terminal, the reference terminal or to the second output terminal, and the second triplet of switches selectively couples the second terminal to either the first input terminal or to the reference terminal or to the first output terminal.

5. A supplying system as claimed in claim 4, wherein the first output voltage and the second output voltage supply the LCD.

* * * * *